(12) United States Patent
Sarkar et al.

(10) Patent No.: US 7,892,684 B2
(45) Date of Patent: Feb. 22, 2011

(54) HEAT EXCHANGER FOR FUEL CELL STACK

(75) Inventors: Partho Sarkar, Edmonton (CA); Hongsang Rho, Edmonton (CA); Luis Yamarte, Edmonton (CA); Gary Kovacik, Edmonton (CA)

(73) Assignee: Alberta Innovates - Technology Futures, Edmonton, Alberta (CA)

( * ) Notice: Subject to any disclaimer, the term of this patent is extended or adjusted under 35 U.S.C. 154(b) by 1257 days.

(21) Appl. No.: 11/454,617

(22) Filed: Jun. 15, 2006

(65) Prior Publication Data

US 2007/0003806 A1    Jan. 4, 2007

Related U.S. Application Data

(63) Continuation of application No. PCT/CA2004/002139, filed on Dec. 15, 2004.

(30) Foreign Application Priority Data

Dec. 15, 2003    (CA) .................................... 2452938

(51) Int. Cl.
*H01M 8/04* (2006.01)
*H01M 8/12* (2006.01)
*H01M 8/24* (2006.01)

(52) U.S. Cl. ........................ 429/434; 429/440; 429/456; 429/458; 429/461; 429/466

(58) Field of Classification Search ........................ None
See application file for complete search history.

(56) References Cited

U.S. PATENT DOCUMENTS 6,532,339 B1    3/2003    Edgar et al.

(Continued)

FOREIGN PATENT DOCUMENTS

CA    2549661 A1    6/2005

(Continued)

OTHER PUBLICATIONS

International Search Report, PCT/CA2004/002139, Apr. 18, 2005.

(Continued)

*Primary Examiner*—Jonathan Crepeau
(74) *Attorney, Agent, or Firm*—Joshua King; Graybeal Jackson LLP

(57) ABSTRACT

This invention relates to a fuel cell system comprising a fuel cell stack and a heat exchanger wrapped around the stack. The fuel cell stack comprises a fuel cell that operates at high elevated temperatures, such as a solid oxide fuel cell; the fuel cell can have a tubular configuration and comprise a pair of concentrically arranged electrode layers sandwiching a concentrically arranged electrolyte layer. The heat exchanger wraps around the fuel cell stack and comprises a flexible, thermally conductive first layer and an overlapping flexible, thermally conductive second layer spaced from the first layer. The first and second layers define adjacent annular oxidant supply and oxidant exhaust channels when wrapped around the stack. The exhaust channel is communicative with heated exhaust oxidant flowing from the stack, and the oxidant supply channel is communicative with supply oxidant that flows to the stack and is heated by heated exhaust oxidant in the adjacent oxidant exhaust channel and from heat radiating from the stack.

18 Claims, 10 Drawing Sheets

U.S. PATENT DOCUMENTS

2003/0134169 A1* 7/2003 Sarkar et al. ............... 429/31
2004/0043267 A1* 3/2004 Schuler et al. ............. 429/26
2004/0157096 A1* 8/2004 Peterson .................... 429/13
2007/0111064 A1* 5/2007 Haile et al. ................ 429/26

FOREIGN PATENT DOCUMENTS

| WO | 0186030 | A1 | 11/2001 |
| WO | 03062503 | A1 | 7/2003 |
| WO | 03069705 | A3 | 8/2003 |

OTHER PUBLICATIONS

PCT Written Opinion, PCT/CA2004/002139, Apr. 18, 2005.
International Preliminary Report on Patentability Dated Jun. 20, 2006, for International Patent Application No. PCT/CA2004/002139 Filed Dec. 15, 2004, 6 Pages.

* cited by examiner

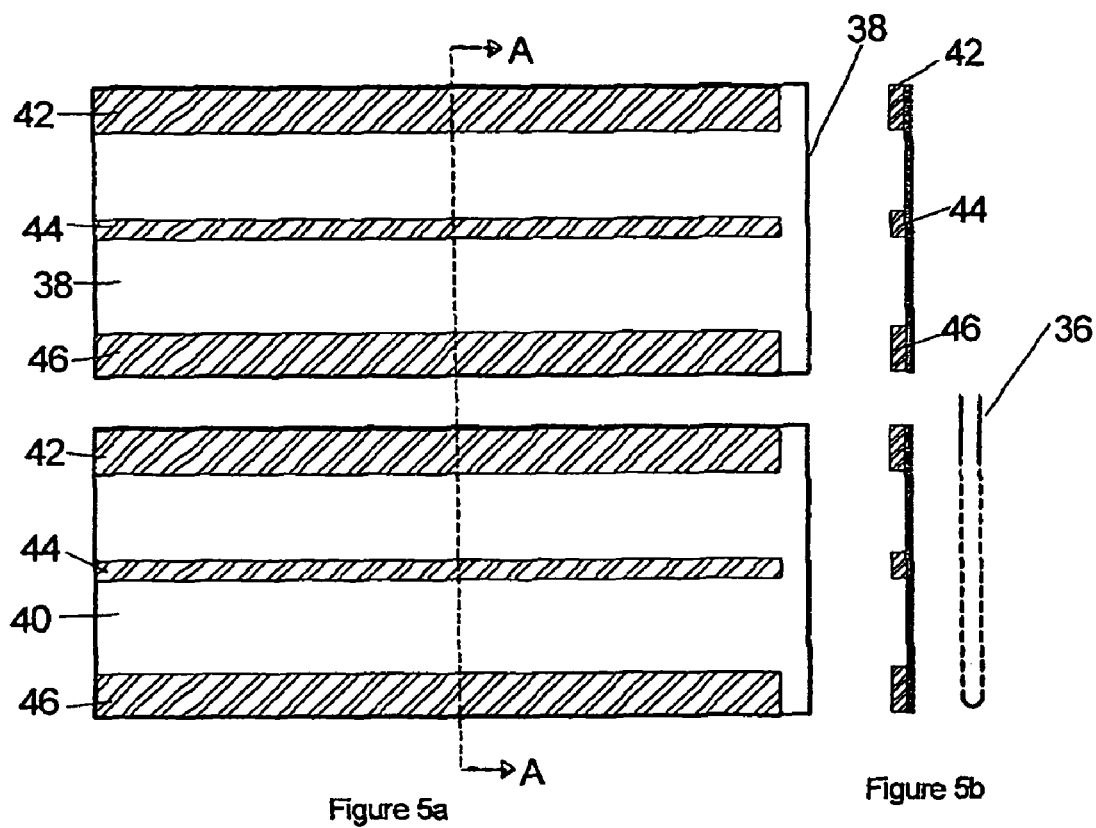

HEAT EXCHANGER FOR FUEL CELL STACK

PRIORITY CLAIM

The present application is a Continuation of International Patent Application No. PCT/CA2004/002139, filed 15 Dec. 2004, which application claims the benefit of Canadian Patent Application No. 2,452,938, filed 15 Dec. 2003; all of the foregoing applications are incorporated herein by reference in their entireties.

FIELD OF THE INVENTION

This invention relates generally to fuel cells, and in particular, to a heat exchanger for a fuel cell stack.

BACKGROUND OF THE INVENTION

There is a class of fuel cells that operate at high elevated temperatures. One type of such fuel cell is a solid oxide fuel cell (SOFC), which comprises two electrodes (anode and cathode) separated by a ceramic, solid-phase electrolyte. To achieve adequate ionic conductivity in such a ceramic electrolyte, the SOFC operates at elevated temperatures typically in the order of about 1000° C. The material in typical SOFC electrolytes is a fully dense (i.e. non-porous) yttria-stabilized zirconia (YSZ) which is an excellent conductor of negatively charged oxygen (oxide) ions at high temperatures. Typical SOFC anodes are made from a porous nickel/zirconia cermet while typical cathodes are made from magnesium doped lanthanum manganate ($LaMnO_3$), or a strontium doped lanthanum manganate (also known as lanthanum strontium manganate (LSM)). In operation, hydrogen or carbon monoxide (CO) in a fuel stream passing over the anode reacts with oxide ions conducted through the electrolyte to produce water and/or $CO_2$ and electrons. The electrons pass from the anode to outside the fuel cell via an external circuit, through a load on the circuit, and back to the cathode where oxygen from an air stream receives the electrons and is converted into oxide ions which are injected into the electrolyte. The SOFC reactions that occur include:

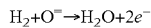

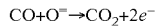

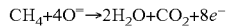 Anode reaction:

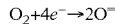 Cathode reaction:

Known SOFC designs include planar and tubular fuel cells. Tubular fuel cells can be grouped together into a stack to increase output. For example, a tubular stack design published by Siemens Westinghouse Power Generation features tubular fuel cells arranged in a side-by-side rectangular array. The large size of the Siemens Westinghouse fuel cells (typically >5 mm diameter) and the relatively low power density (power output per unit volume) of the stack design makes such a fuel cell stack impractical for small scale applications such as portable electronic devices. Applicant's own PCT application no. PCT/CA01/00634 discloses a method of manufacturing small diameter tubular SOFC that are particularly suitable for small-scale applications. Such fuel cells can be embedded in a solid phase foam matrix to form a stack, as disclosed in Applicant's PCT application no. PCT/CA03/00216.

One of the challenges for SOFC systems is efficient thermal management. It is well known that larger SOFC systems (>5 kW) typically generate more heat than needed to keep the fuel cell stack at a suitable operating temperature, and therefore, need efficient heat removal techniques to prevent overshooting the temperature of the stack. In contrast, smaller SOFC systems generate less heat and consideration must be given in certain situations to retaining enough heat to keep the stack sufficiently warm. When a stack's size is reduced, the stack's ratio of outer surface area to volume tends to increase, which results in an increase in potential heat loss relative to rated power output. As SOFCs have to operate at high elevated temperatures, it is important to keep the stack and incoming reactant gases at suitable elevated operating temperatures. Inadequate thermal management can result in significant amounts of generated heat to be lost, such that heat from an external source must be used to heat the incoming reactant streams as well as to keep the stack within its operating temperature range. Such external heat sources constitute a parasitic load on the SOFC system which reduces the operating efficiency of the system.

A heat exchanger design known as a "Swiss roll" was conceived about thirty years ago by Felix Weinberg of Imperial College London. This heat exchanger had a supply fuel flowing in a channel running parallel with a channel carrying hot exhaust. The channels were rolled into a spiral, which had the effect of substantially increasing the internal surface area that was exchanging heat, as well as minimizing external surfaces that were losing heat. More recently, a team at the California Institute of Technology led by Sossina Haile has experimented with installing a fuel cell within a Swiss roll heat exchanger. Known Swiss roll heat exchangers are typically rigid structures having complex geometries that are fabricated from high-temperature tolerant materials such as titanium and ceramic. The manufacture of such heat exchangers and the integration of the fuel cell within the heat exchanger are laborious and not commercially practical for large scale manufacture.

SUMMARY OF THE INVENTION

It is a general object of the invention to provide effective thermal management of a fuel cell stack, and in particular, to effectively heat reactant gases using the heat created during electricity generation in the stack. It is a specific objective of the invention to provide a heat exchanger for a fuel cell stack that effectively transfers heat from exhaust reactant to supply reactant, provides thermal insulation to the stack, and is relatively cost-effective to manufacture.

According to one aspect of the invention, there is provided a fuel cell system comprising a fuel cell stack and a heat exchanger wrapped around the fuel cell stack. The stack has at least one fuel cell that operates at elevated temperatures above 150° C.; a suitable such fuel cell is a solid oxide fuel cell (SOFC). The SOFC can be a tubular design having a pair of concentrically arranged electrode layers sandwiching a concentrically arranged electrolyte layer. The heat exchanger comprises a flexible thermally-conductive first layer and a flexible thermally-conductive second layer overlapping the first layer. The two layers are wrapped around the stack such that annular reactant supply and exhaust channels are defined with heated exhaust reactant flowing through the exhaust channel and heat radiating from the stack heating supply reactant flowing through the supply channel. In addition to exchanging heat between supply and exhaust reactant, the heat exchanger also serves to provide thermal insulation for the stack.

The heat exchanger can be a cross-flow type heat exchanger with the supply and exhaust channels respectively having an inlet and an outlet at the outer periphery of the heat exchanger, and respectively having an outlet and an inlet at the interface between the heat exchanger and the stack. The first and second layers can be rectangular sheets having a longitudinal dimension corresponding to the length of the fuel cell, and a transverse dimension corresponding to the number of selected windings the heat exchanger wraps around the stack. The heat exchanger can wind one or more times around the stack; the transverse dimension can be selected so that there are enough windings around the stack that enough heat is absorbed by the layers that the outer periphery of the heat exchanger is cool enough for human touch. The two heat exchanger layers can be of unequal transverse lengths, such that one of the layers can wrap at least one additional winding around the stack more than the other layer.

The reactant flowing through the supply and exhaust channels can be either air or fuel. When air, the outer electrodes of the fuel cells in the stack are cathodes, and when fuel, the outer electrodes are anodes. Alternatively, the heat exchanger can have multiple supply channels in which one of the supply channels carries fuel and another carries air; the fuel supply channel is fluidly coupled to the anode side of the fuel cell stack, and the air supply channel is fluidly coupled to the cathode side of the fuel cell stack. In this case, the exhaust channel can be configured to carry a mixture of exhaust air and unreacted fuel. The fuel supply channel can be coated with a reforming catalyst or filled with a porous reforming catalyst or a porous catalyst support coated with a reforming catalyst so that hydrocarbon fuel traveling through the fuel supply channel is reformed.

The heat exchanger can further comprise elongated flexible spacers mounted to a surface of each layer; the spacers cooperate with the layers to define the supply and exhaust channels when the layers are wrapped around the stack. Alternatively, the channels can be formed directly into the layers themselves. The heat exchanger can also include a perforated distribution layer that surrounds the stack and is located inside of the first and second layers. The distribution layer is in fluid communication with an outlet of the supply channel such that supply reactant discharged from the supply channel is radially distributed by the distribution layer to the stack. A perforated metal foil or a porous metal tube is particularly suitable as the distribution layer. This metal foil or tube can be coated with a heat reflective coating, or first coated with a glass, glass-ceramic, or ceramic thermal barrier coating then optionally with a heat reflective coating.

The stack can be a plurality of tubular fuel cells that are embedded in spaced side-by-side arrangement within a solid phase porous foam matrix. In such case, the stack has an exhaust oxidant collector and the fuel cells surround the collector; reactant supply air is fed through the distribution layer to the outer periphery of the stack, and unreacted air is collected by the collector located within the stack. The collector is fluidly coupled to an inlet of the reactant exhaust channel such that exhaust oxidant collected by the collector is transmitted to the exhaust channel.

Instead of two separate sheets, the heat exchanger layers can be formed from a single folded metal foil sheet. The metal foil sheet can be the same material as used for the distribution layer.

The heat exchanger can have more than two layers. For example, the heat exchanger can further comprise a flexible thermally conductive third layer that overlaps and is spaced from the second layer, such that when wrapped around the stack with the first and second layers, a third reactant channel is formed. Alternatively, the third layer can be a flexible thermally insulating layer that when wrapped around the stack with the first and second layers, contributes to retaining heat within the stack. This insulating layer can be a ceramic thermal insulating blanket, an aerogel blanket, or a sealed vacuum channel.

BRIEF DESCRIPTION OF DRAWINGS

FIG. 5($a$) is schematic plan view of inner and outer heat exchanger sheets with spacers, and FIG. 5($b$) is a schematic side view of same at section A-A and an exhaust air collection tube.

DETAILED DESCRIPTION OF EMBODIMENTS OF THE INVENTION

When describing the present invention, the following terms have the following meanings, unless indicated otherwise. All terms not defined herein have their common art-recognized meanings.

The term "ceramic" refers to inorganic non-metallic solid materials with a prevalent covalent or ionic bond including, but not limited to metallic oxides (such as oxides of aluminum, silicon, magnesium, zirconium, titanium, chromium, lanthanum, hafnium, yttrium and mixtures thereof) and non-oxide compounds including but not limited to carbides (such as of titanium tungsten, boron, silicon), silicides (such as molybdenum disicilicide), nitrides (such as of boron, aluminum, titanium, silicon) and borides (such as of tungsten, titanium, uranium) and mixtures thereof; spinels, titanates (such as barium titanate, lead titanate, lead zirconium titanates, strontium titanate, iron titanate), ceramic super conductors, zeolites, and ceramic solid ionic conductors (such as yttria stabilized zirconia, beta-alumina and cerates).

The term "cermet" refers to a composite material comprising a ceramic in combination with a metal, typically but not necessarily a sintered metal, and typically exhibiting a high resistance to temperature, corrosion, and abrasion.

Figure 1:
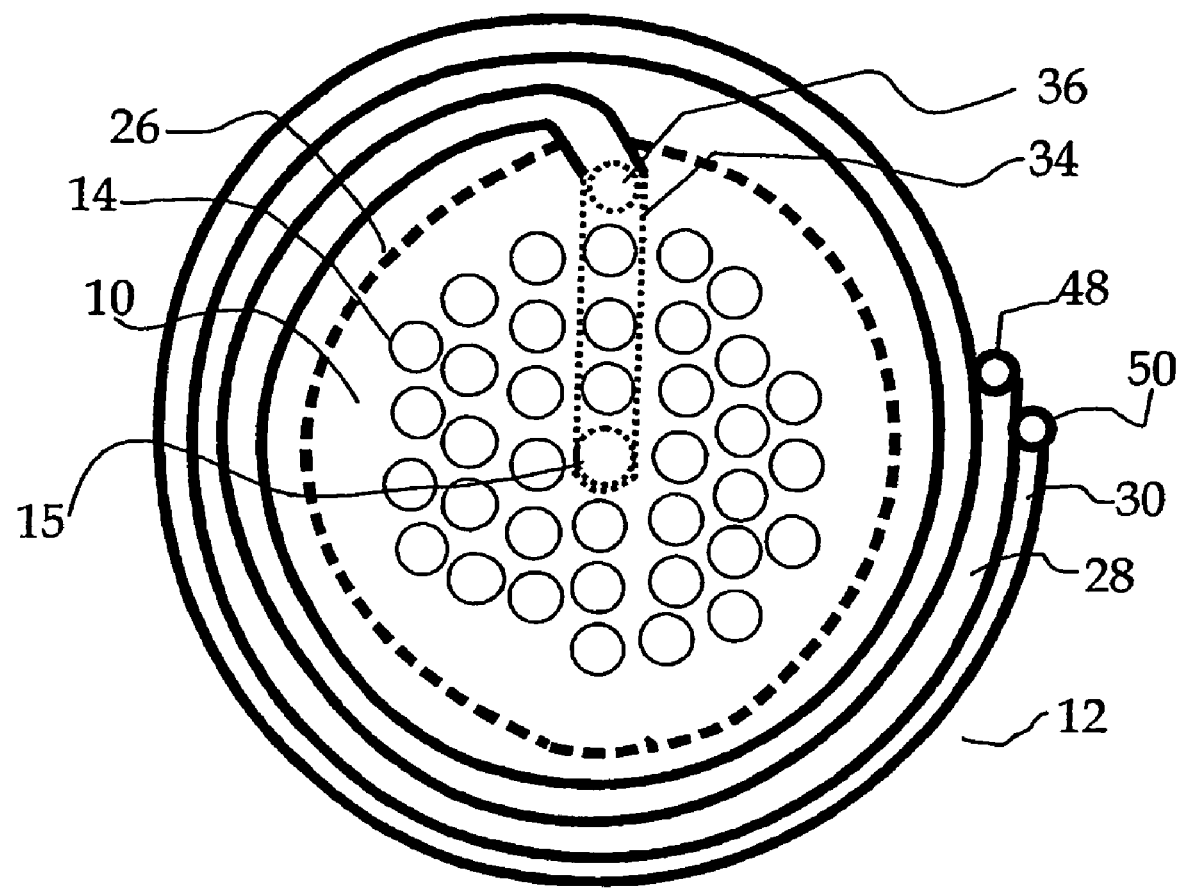
FIG. 1 is a schematic sectioned top view of an oxidant flow heat exchanger wrapped around a tubular fuel cell stack.
Figure 2:
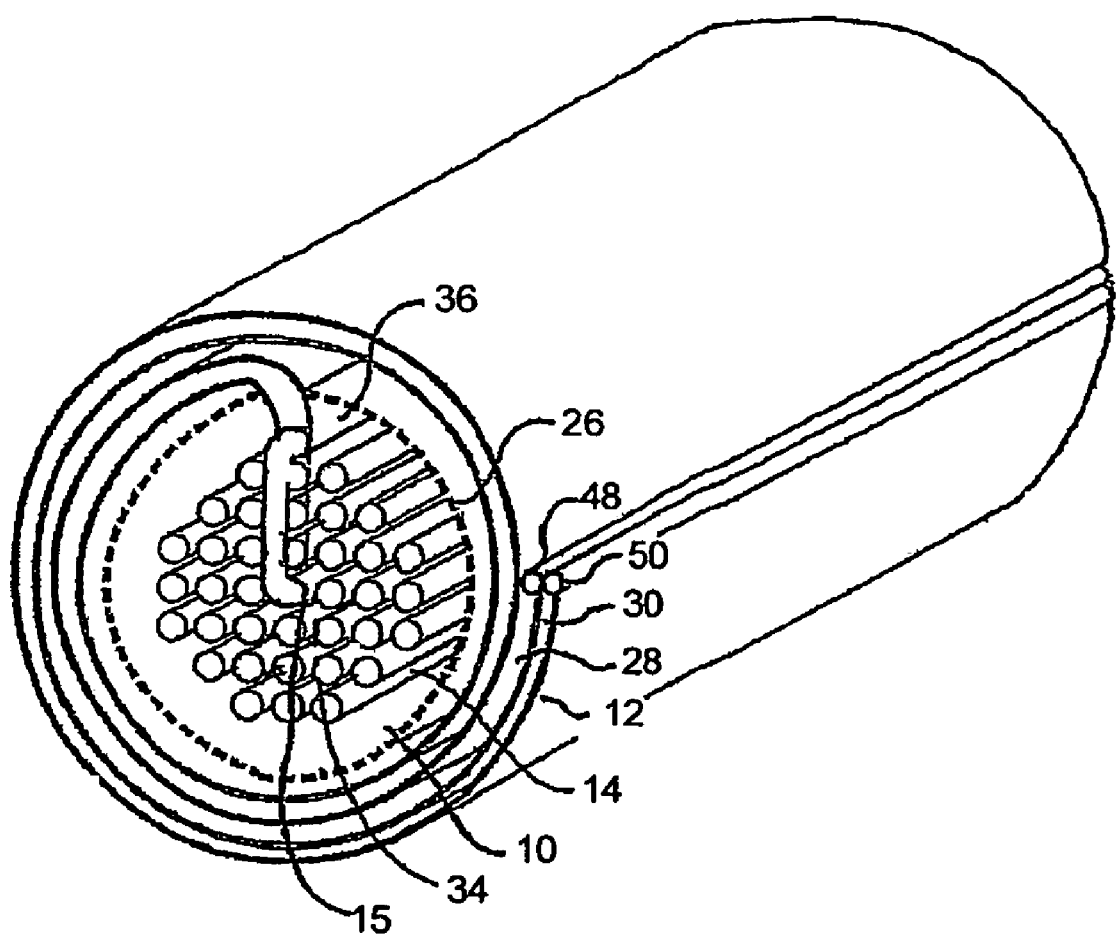
FIG. 2 is a schematic perspective view of the oxidant flow heat exchanger and tubular fuel cell stack of FIG. 1.

Referring to FIGS. 1 and 2 an according to one embodiment of the invention, a solid oxide fuel cell stack 10 is surrounded by an oxidant flow heat exchanger 12. The stack 10 comprises a plurality of longitudinally-extending tubular solid oxide fuel cells 14 (SOFC) arranged side-by-side in a cluster. Inside the cluster is a perforated exhaust oxidant collection tube 15 arranged longitudinally with the fuel cells 14. The fuel cells 14 are spaced in the cluster to allow the passage of oxidant from the outside of the cluster to the exhaust oxidant collection tube 15. While the stack 10 shown in FIGS. 1 and 2 shown are of a plurality of fuel cells arranged in to a cylindrical cluster, the fuel cells can be arranged in other geometries, e.g. the fuel cells can be arranged into a cluster having a rectangular cross-section.

Figure 3:
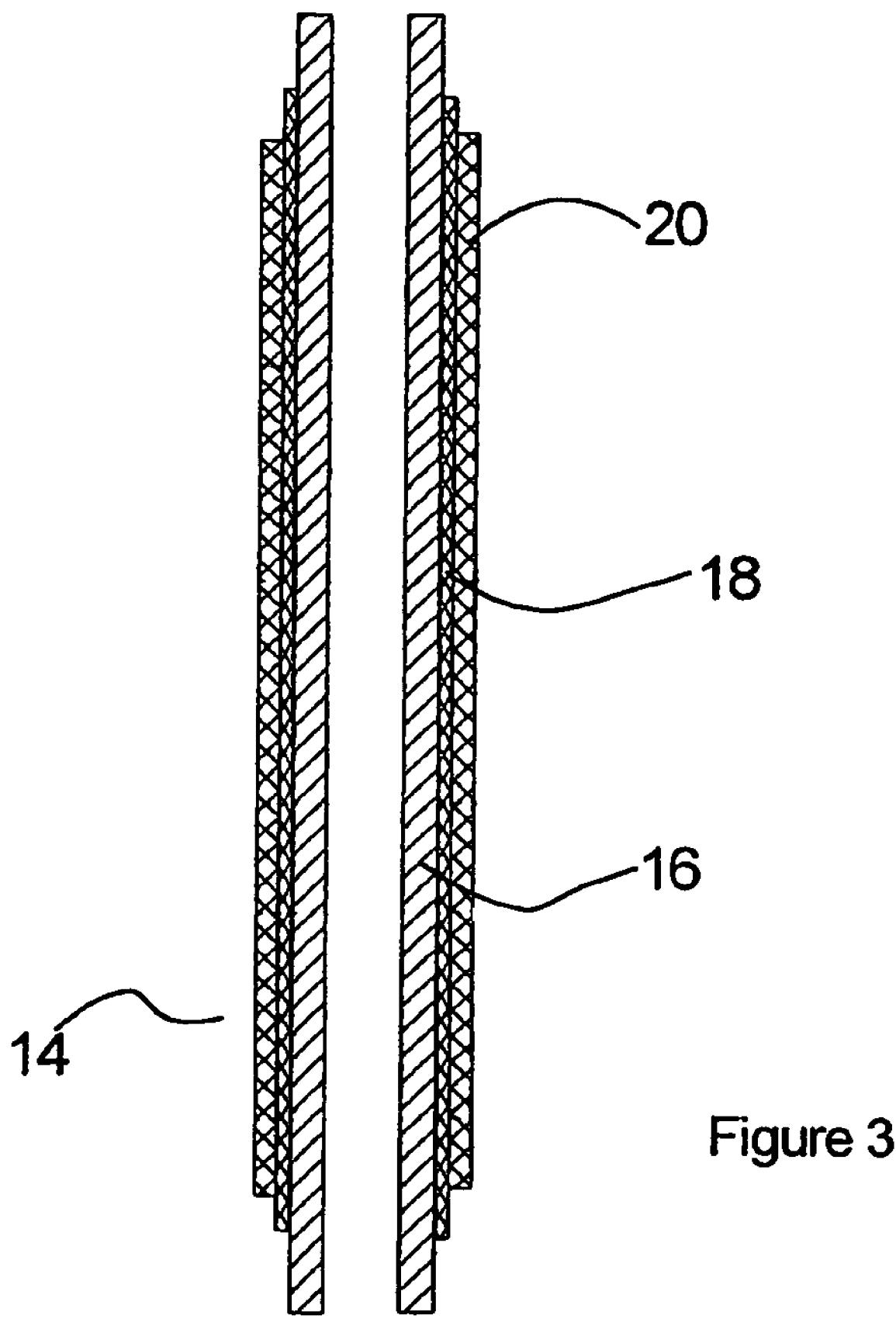
FIG. 3 is a schematic side cut-away view of a tubular solid oxide fuel cell.

Referring to FIG. 3, each fuel cell 14 is a hollow tubular ceramic structure and comprises concentric layers 16, 18, 20 that serve as the anode, electrolyte, and cathode. In this embodiment, the inner layer 16 is the anode and the outer layer is the cathode 20 as the heat exchanger 12 is configured to deliver and remove oxidant such as air. In this configuration, the inside of each fuel cell 14 defines a fuel chamber in which fuel such as hydrogen gas is reacted at the anode membrane 16.

Figure 4:
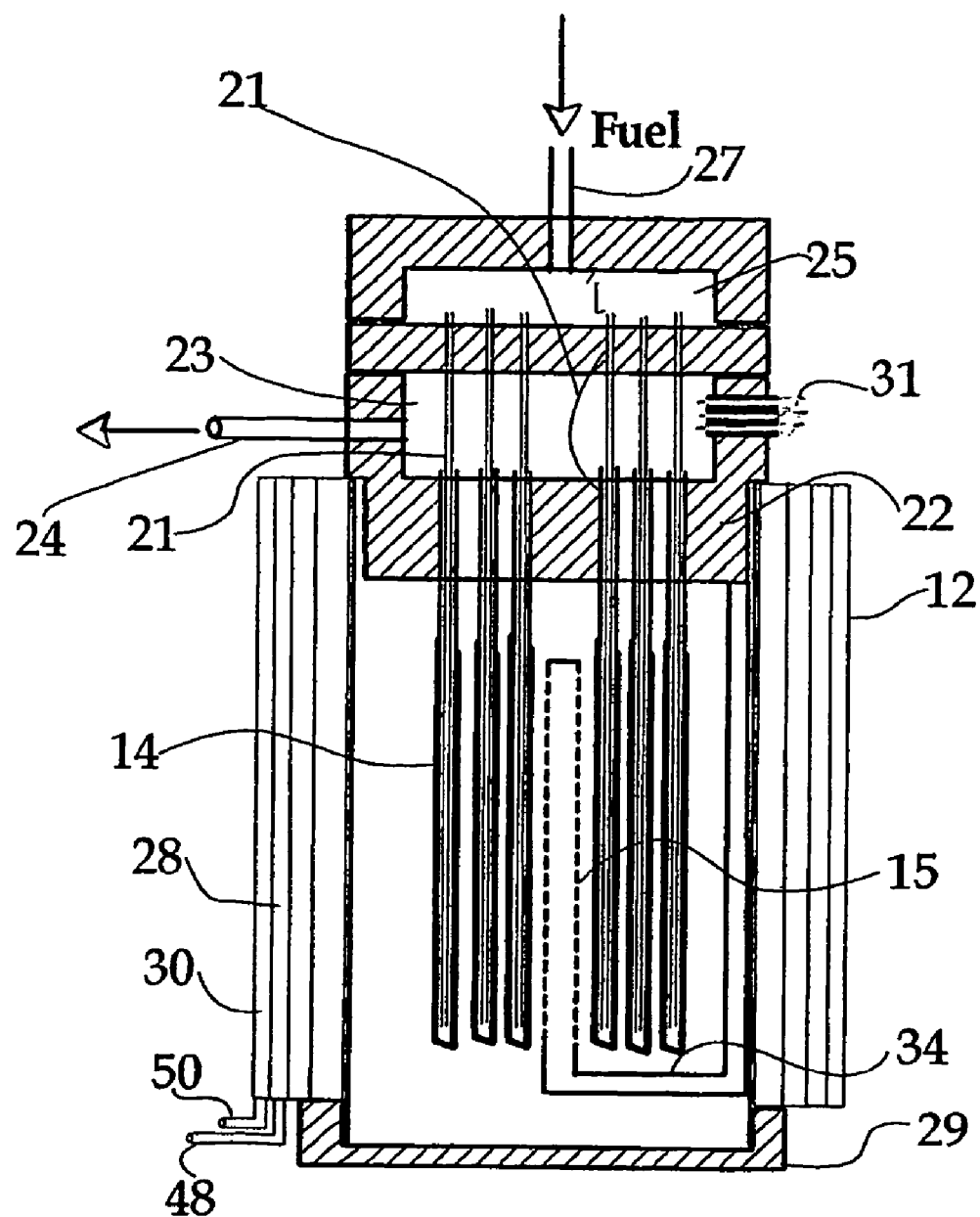
FIG. 4 is a schematic side cut-away of the fuel cell stack of FIG. 1 coupled to an end cap and a fuel manifold.
Figures 6A, 6B:
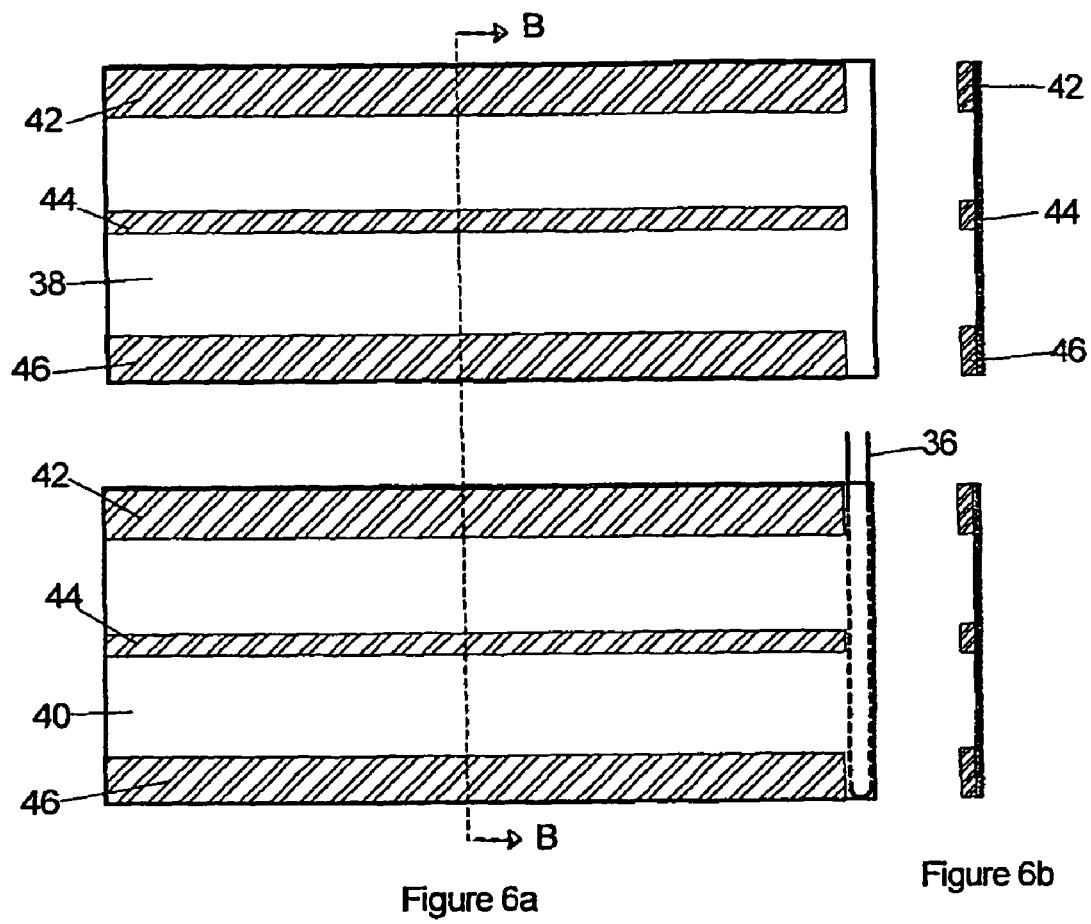
FIG. 6($a$) is a schematic plan view of the exhaust air collection tube mounted to the outer heat exchanger sheet, and FIG. 6($b$) is a side view of same at section B-B.

Referring to FIG. 4, fuel supply and exhaust conduits 21 are coupled to each fuel cell 14 to deliver and remove fuel to and from the inside of each fuel cell 14. The fuel supply and exhaust conduits 21 are located in a fuel manifold 22, which is connected to one end of the stack 10 by a gas-tight seal. The fuel exhaust conduits 21 discharge fuel into a fuel discharge chamber 23 which discharges fuel out of the manifold 22 via a main fuel discharge outlet 24; the fuel supply conduits 21 are connected to a fuel supply chamber 25 inside the manifold 22 which receives fuel from a main fuel supply inlet 27. The other end of the stack 10 is sealed with gas-tight end cap 29. The manifold 22, end cap 29 and heat exchanger 12 form a gas-tight seal around the stack 10 to prevent reactant gas from leaking. Electrical connectors 31 are mounted on the manifold and electrically coupled to the fuel cells but electrically isolated from the manifold; the arrangement of electrical connectors to collect current from a fuel cell stack is well known and thus not described in detail here. The heat exchanger 12 wraps around the stack and has an oxidant supply channel 28 for supplying oxidant to the stack 10 and an oxidant exhaust channel 30 for removing unreacted oxidant from the stack 10.

Alternatively, the heat exchanger 12 can be reconfigured to deliver and remove fuel in which case the inner layer 16 of each fuel cell 14 is the cathode and the outer layer 20 is the anode; in such case the inside of the fuel cells 14 defines an oxidant chamber and oxidant conduits (not shown) in an oxidant manifold are coupled to the inside of each fuel cell to deliver and remove oxidant.

The fuel cells 14 can be of a micro-tubular type as taught in Applicant's PCT applications PCT/CA01/00634 and PCT/CA03/00059. Using such micro-tubular fuel cells, the stack 10 and heat exchanger 12 can be particularly suitable for small-scale portable applications that generate kW. The first PCT application teaches the production of a micro-tubular SOFC by electrophoretic deposition (EPD) and the second PCT application teaches the production of same by metal electrodeposition (MED) and composite electrodeposition (CED). Tubular fuel cells produced by such techniques can have diameters as small as about 10 µm, and various cross-sectional geometries, such as circular, square, rectangular, triangular, and polygonal. Although this description primarily describes a fuel cell stack design using micro-sized tubular fuel cells with a circular cross-section, it is within the scope of the invention to use larger diameter fuel cell tubes and/or tubes with non-circular cross-sectional geometries.

The fuel cells 14 can be secured in place and spaced from one another with spacers (not shown). Or, the fuel cells 14 can be secured in place by a solid phase, porous ceramic foam matrix (not shown) as taught in Applicant's PCT application no. PCT/CA03/00216.

The heat exchanger 12 is a cross-flow type heat exchanger that can exchange heat from exhaust oxidant to supply oxidant (or in an alternative configuration, exchange heat from exhaust fuel to supply fuel). The heat exchanger 12 shown in FIGS. 1 and 2 have a single oxidant supply channel 28 and a single oxidant exhaust channel 30; but the heat exchanger 12 can be readily modified to flow the oxidant gases in two or more channels, or to flow both oxidant and fuel to and from the stack 10. When supplying both fuel and oxidant to the stack, the heat exchanger 12 has a fuel supply channel (not shown) that is fluidly coupled to the anode side of the fuel cells 14, and a oxidant supply channel (not shown) that is fluidly coupled to the cathode side of the fuel cells 14. Also, separate exhaust channels can be provided to exhaust fuel and oxidant (not shown); or, a single exhaust channel can be provided that exhausts a mixture of unreacted oxidant and fuel (not shown).

When provided with a fuel supply channel, the fuel supply channel can be coated with a reforming catalyst to reform hydrocarbon fuel flowing therethrough; alternatively, the channel can be filled with a reforming catalyst material having a porous microstructure, or be filled with a porous catalyst support structure that is coated with a reforming catalyst material.

The supply oxidant stream is heated primarily from the waste heat contained in the exhaust oxidant stream; however, since the heat exchanger 12 is wrapped around the stack 10, the oxidant supply stream is also heated by heat radiating out from the stack 10. Preferably, the heat exchanger 12 wraps enough times around the time to also provide substantial thermal insulation for the stack 10.

The heat exchanger 12 comprises a porous oxidant distribution layer 26 that wraps around the stack 10 and that serves to distribute heated supply oxidant radially along the stack length. The oxidant distribution layer 26 is a perforated metal foil having a thickness of less than or equal to 250 µm and preferably around 100 µm and having sufficient porosity to enable air to pass therethrough at oxidant supply flow rates typically demanded by the stack 10. The distribution layer 26 can also have an optional outer protective and thermally insulating coating to protect the foil from oxidation, corrosion, hydrogen embrittlement, etc., and to reduce heat loss from the stack 10. Optionally, the coating can be glass, and/or have a reflective layer to reflect radiating heat back to the stack 10. Suitable materials for the foil include steel, stainless steel, Inconel, super-alloys etc for high temperature (>600° C.) application, and copper and aluminum for intermediate temperature applications (<600° C.). Alternatively, the distribution layer 26 can be a rigid perforated metal tube (not shown) made of similar materials as the foil.

Unreacted oxidant and other combustion products ("oxidant exhaust") are collected by the collection tube 15 and are transported to an exhaust carrying tube 34 coupled to one end of the collection tube 15 (the other end of the collection tube 15 is closed). The exhaust carrying tube 34 fluidly couples the collection tube 15 to an oxidant exhaust inlet 36, which is a longitudinally extending perforated tube located between the distribution layer 26 and the stack 10, and which is arranged substantially parallel to the stack 10. One end of the oxidant exhaust channel 30 ("collection end") extends through a longitudinal gap in the distribution layer 26 and is fluidly coupled to the oxidant exhaust inlet 36; oxidant exhaust flow through the oxidant exhaust inlet 36, through the oxidant exhaust channel 30 and away from the fuel cell stack 10. Similarly, supply oxidant delivered by the oxidant supply channel 28 is discharged uniformly around the outside of the oxidant distribution layer 26; the oxidant passes through the distribution layer 26 and to the fuel cells 12. Alternatively, the collection tube 15, exhaust carrying tube 34 and oxidant exhaust inlet 36 can be integrated into a single U-shaped tube (not shown) having perforates near each end to enable exhaust oxidant to travel from the stack, into the U-shaped tube and into the oxidant exhaust channel 30.

Referring to FIG. 5, the components for the heat exchanger 12 include the oxidant distribution layer 26, a pair of transversely-elongated separator sheets 38, 40 ("inner" and "outer" sheets), elongated spacers 42, 44, 46, and an oxidant exhaust inlet and outlet 36, 50 (see FIG. 1). These components 26, 36, 38, 40, 42, 44, 46, 50 are made from a flexible material that has a good thermal conductivity and is able to withstand typical SOFC operating temperatures, i.e. around 800°. In particular, the sheets 38, 40 and spacers 42, 44, 46 can be made of the same metal foil used for the distribution layer 26; the sheet foil 38, 40 thickness is selected to provide the sheet foil 38, 40 with sufficient flexibility to wrap around the stack as well as sufficient mechanical integrity to withstand the operating conditions for a commercially reasonable length of time. For the embodiment shown in the Figures, the sheet should be at least 20 µm thick and preferably in the order of about 150 µm thick. The spacers 42, 44, 46 have a thickness that provides a sufficiently deep channel for an adequate flow rate of reactant, yet retain sufficient flexibility to be wrapped around the stack 10. The spacers 42, 44, 46 can alternatively be made from other materials that are flexible and able to withstand typical SOFC operating temperatures, including: a porous metal sheet, solid state porous metal foam, flexible metal or ceramic blankets, mats and fiber textiles.

The assembly of the heat exchanger 12 is shown in FIGS. 5 to 9 and described as follows: Referring to FIG. 5, the oxidant exhaust and supply channels 30, 28 are manufactured by welding the spacers 42, 44, 46 transversely across the surface of a pair of rectangular separator sheets 38, 40, such that open faced channels are formed between the spacers 42, 44, 46 with the sheets 38, 40 serving as the channel floors. The spacers 42, 44, 46 define the oxidant supply and exhaust channels 28, 30 as well as provide mechanical stability for the sheets 38, 40. The spacers 42, 44, 46 are positioned on the sheet such that one end is flush with one longitudinal edge of the sheets 38, 40, and the other end terminates short of the other longitudinal end of the sheets 38, 40, to leave exposed a sheet portion onto which the exhaust inlet 36 is mounted, as shown in FIG. 6(a). The oxidant exhaust inlet 36 is mounted to the exposed sheet portion of the outer sheet 40 in a way that forms a gas tight bond with the foil material. The perforations of the inlet 36 are situated inside the foil so that gas is released only into the channel.

The inner sheet 38 is attached at its other longitudinal edge to an oxidant supply inlet 48 and the outer sheet 40 is attached at its other longitudinal ledge to an oxidant exhaust outlet 50. Both the supply inlet 48 and exhaust outlet 50 are elongated perforated tubes. The transverse edges of the sheets 38, 40 are sealed to prevent oxidant leakage. The top and bottom spacers 42, 46 also serve as gas seals to prevent oxidant leakage; additional spacers can be provided to increase the number of flow channels.

Figures 7A, 7B:
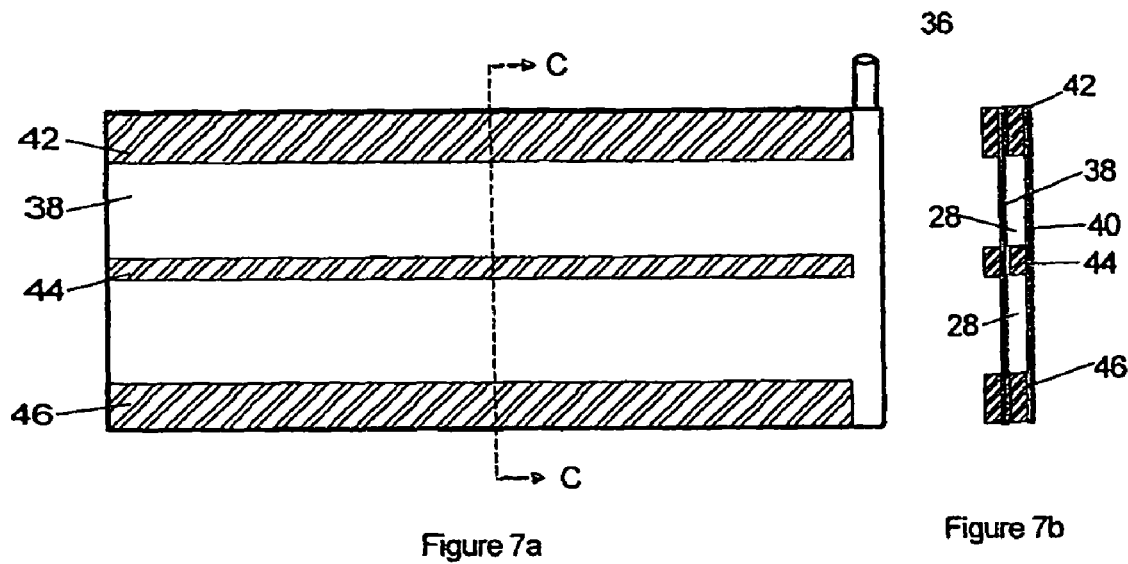
FIG. 7($a$) is a schematic plan view of the inner and outer heat exchanger sheets joined together and FIG. 7($b$) is a side view of same at section C-C.

Then, as shown in FIGS. 7(a) and (b), the inner sheet 38 is overlaid onto the outer sheet 40 such that the oxidant exhaust inlet 36 and the top and bottom spacers 42, 46 are welded to form a gas tight seal between the inner and outer sheets 38, 40; the space in between the two sheets 38, 40 define the oxidant supply channel 28.

The fuel cells 12 and associated fuel supply and exhaust conduits are coupled to the manifold 22, and an upper transverse edge of the distribution layer is wrapped around the manifold such that the bottom transverse edge of the distribution layer is in line with the bottom of the fuel cells 12. The transverse length of the distribution layer 26 is slightly less than the circumference of the manifold 22; when the distribution layer 26 is wrapped around the stack 10, a longitudinal gap (not shown) is formed along the length of the stack 10. The end of the sheets 38, 40 having the exhaust inlet 36 mounted thereto is inserted through the longitudinal gap in the distribution layer 26, such that the exhaust inlet is located in the vicinity of the stack 10. Then, the oxidant distribution layer 26 is welded to the sheets 38, 40.

Then, the sheets 38, 40 are wrapped around the stack 10 such that the spacers 42, 44, 46 on the inner sheet 38 serve to define the oxidant exhaust channel 30. These spacers 42, 44, 46 are welded to the adjacent sheet 40 (i.e. the back of the outer sheet) to establish a gas tight seal. The transverse dimension ("width") of the heat exchanger 12 is selected to be long enough for the sheets 38, 40 to wind around the stack 10 enough times that the sheets 38, 40 and reactants flowing therethrough absorb most of the heat radiating from the stack 10, such that the outer periphery of the heat exchanger is cool enough for human touch. In other words, little or no additional thermal insulation (e.g. a low thermal conductivity aerogel layer) is required for the outer periphery of the stack 10.

Finally, the end cap 29 is attached to the bottom of the stack 10. In operation, the heat exchanger 12 is coupled to an oxidant source at oxidant supply inlet 48; when using air as oxidant, the heat exchanger 12 can be coupled to an air blower such as a fan (not shown) to deliver pressurized air to the heat exchanger 12. Alternatively, an exhaust pump (not shown) can be coupled to the heat exchanger 12 at the oxidant exhaust outlet 50 to draw air through the heat exchanger 12. Pressurized air flows through the oxidant supply channel 28 and to the perforated distribution layer 26, wherein the air flows through the perforations and to the outside of the stack 10 and is reacted. Unreacted exhaust air flows through the spaces between the fuel cells 14 in the stack 12 and to the collection tube 15, through the exhaust inlet 36, through the exhaust channel 30 and out of the heat exchanger 10 via the exhaust outlet 50. Heat generated from the electrochemical reaction heats the exhaust air as well as radiates from the stack 10. Heat radiates from the exhaust air and conducts through the sheets 38, 40 to heat the supply air. The supply air is also heated from the heat radiating from the stack 10.

It is expected that the use of relatively inexpensive flexible metal foil for the separator sheets 38, 40 and spacers 42, 44, 46 will offer significant manufacturing advantages over known methods for fabricating "Swiss roll" type heat exchangers, as known Swiss roll heat exchangers are typically cast or extruded into rigid structures. For example, the use of flexible metal foil offers design flexibility, as the metal foil can be easily cut into different shapes and sizes to accommodate heat exchangers of varying lengths and diameters (i.e. number of windings around the stack).

Instead of using the manifold 22 and end cap 29, and according to another embodiment of the invention (not shown), the heat exchanger 12 has a longitudinal dimension ("length") that is as least as long as the length of the fuel cells 14. When the longitudinal dimension of heat exchanger 12 is longer than that the fuel cell length, one or both ends of the heat exchanger 10 can be crimped closed after the fuel cell sheets have been wrapped around the stack. Reactant flow conduits can be fed into the fuel cell system via openings made at the crimped heat exchanger end 12.

According to another embodiment of the invention (not shown), the heat exchanger is modified to transmit oxidant to and from a single tubular fuel cell, or multiple fuel cells arranged in concentric fashion. For a single tubular fuel cell, the distribution layer 26 surface is impermeable (i.e. has no perforations), and instead has an opening at one end thereof, e.g. bottom end, to feed supply oxidant to the bottom of the fuel cell. The collection tube 15 is eliminated, and the exhaust collection inlet 36 is an opening located at the opposite end of the distribution layer opening, e.g. at the top of the fuel cell. In operation, supply oxidant is guided by the distribution layer 26 to the bottom of the fuel cell wherein the oxidant flows upwards over the cathode and is electrochemically reacted. Exhaust oxidant exits through the top of the fuel cell through the collection inlet 36.

Figure 8:
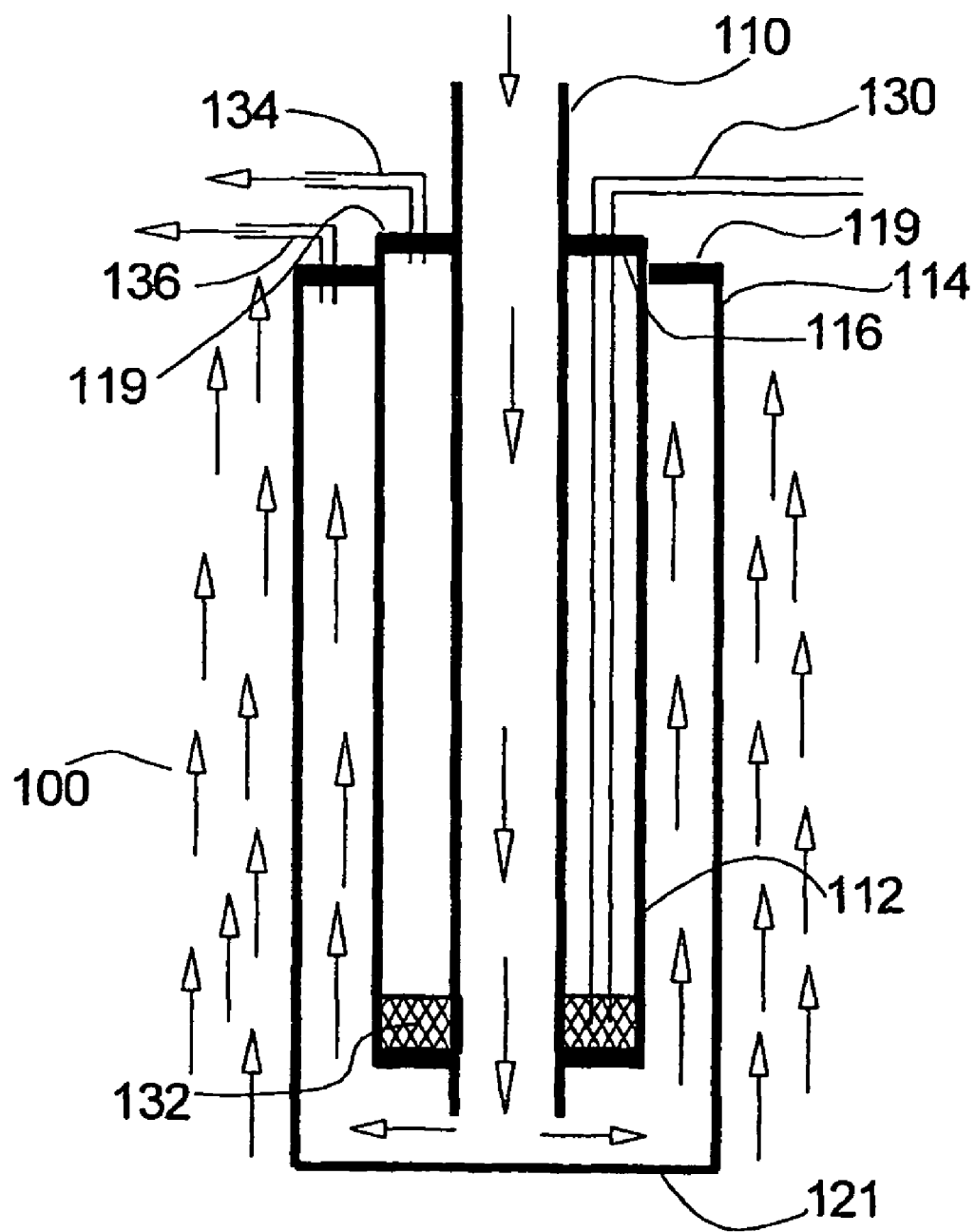
FIG. 8 is a schematic side cut-away view of a fuel cell stack having multiple concentrically arranged fuel cells with oxidant and fuel flow conduits for coupling to the heat exchanger.

According to another embodiment of the invention and referring to FIG. 8, the heat exchanger 12 can be wrapped around a fuel cell stack having a plurality of concentrically arranged fuel cells. For a concentrically arranged stack 100 shown in FIG. 8, each of the inner and outer fuel cells 110, 114 are formed so that the inner layer of each tube is the anode, and the outer layer is the cathode. The middle fuel cell 112 is formed so that the inner layer is the cathode, and the outer layer is the anode. The fuel cells are arranged concentrically and the middle fuel cell 112 is joined to the inner fuel cell 110 at its top end by a first annular top end cap 116 and at its bottom end by an annular bottom end cap 118; the opening in the end caps 116, 118 are dimensioned to snugly fit around the periphery of the inner fuel cell 110. The middle fuel cell 112 is joined to the outer fuel cell 116 by a second annular top end cap 119; the opening in the top end cap 119 is dimensioned to snugly fit around the periphery of the middle fuel cell 112. The outer tube 114 may be formed with a closed bottom end 121, or with an open bottom end that is closed with a gas-tight bottom end cap 121. Top and bottom end caps 116, 118, 119, 121 all are connected to respective fuel cells 110, 112, 114 to form a gas-tight seal. The heat exchanger 12 includes the modifications for use with a single tubular fuel cell as well as the following modifications for use with the concentrically arranged stack 100: an oxidant supply conduit 130 is connected at one end to an opening at the top of the distribution layer 26 and at the other end to the bottom of an annular chamber 132 defined as the space between the inner and middle fuel cells 110, 114. An oxidant exhaust conduit 134 is connected at one end to the collection inlet 36 and at another end to the top of the annular chamber 132. Fuel is supplied from fuel manifold to the inside of the inner fuel cell 110 and out of the stack via discharge tube 136. With such modification, the heat exchanger 12 operates to supply and remove oxidant to and from the outside of the stack 110 as well as to the annular chamber 132.

According to another embodiment of the invention, the channels 28, 30 can be made from a single sheet instead of two overlaid sheets, by folding the single sheet transversely around the exhaust inlet 36, or longitudinally along the sheet's centerline.

Figure 9:
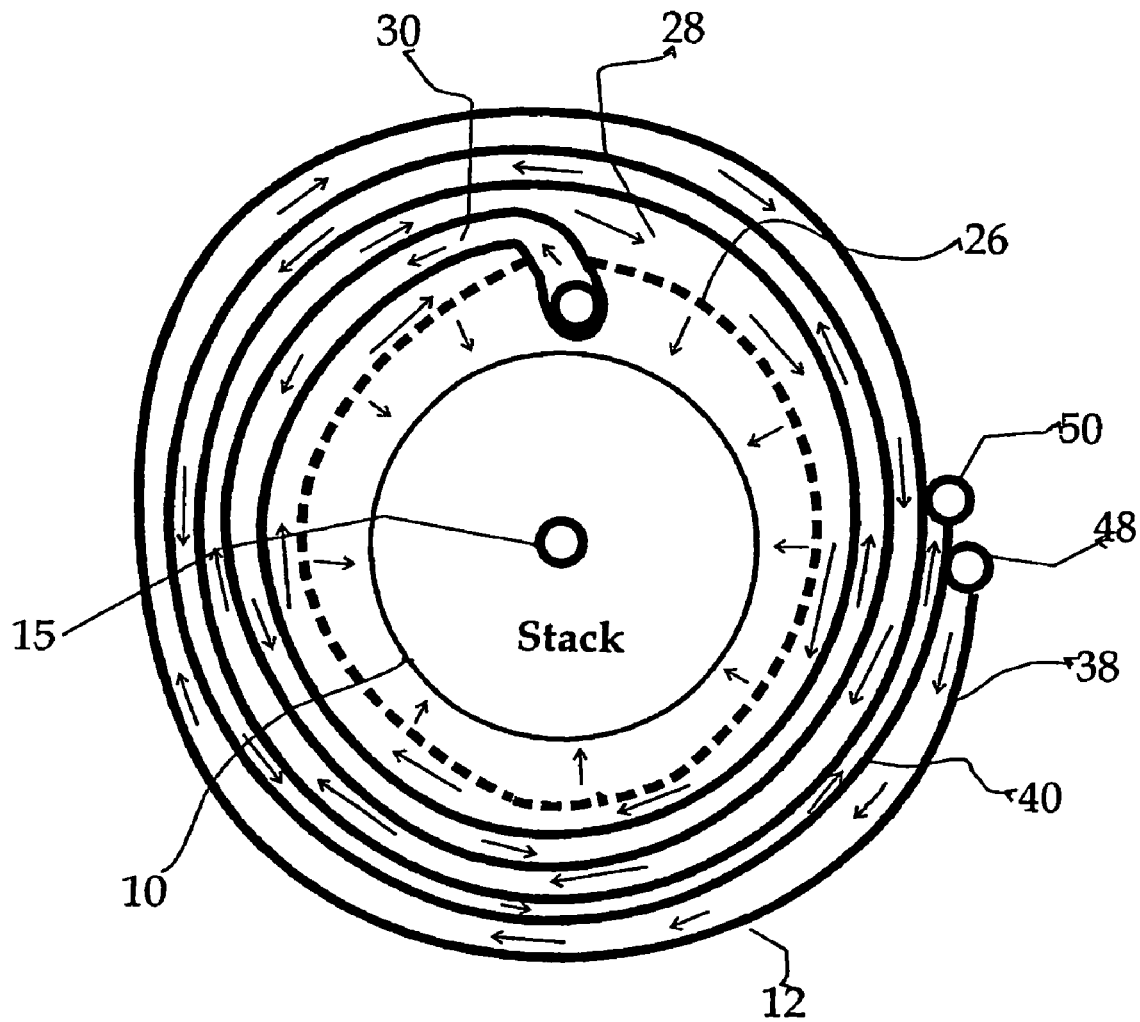
FIG. 9 is a schematic perspective view of another embodiment of an oxidant flow heat exchanger wrapped around a tubular fuel cell stack.

According to another embodiment of the invention and referring to FIG. 9, the inner sheet 38 and its spacers 42, 44, 46 are transversely longer than the outer sheet 40, by a length which enables the inner sheet 38 to wind one additional turn around the stack 10 than the outer sheet 40. This ensures that the oxidant supply channel 38 is situated on the outside of the oxidant exhaust channel 40, which more fully utilizes the radiated heat from the exhaust flow, as well as keeps to outside surface of the heat exchanger 12 cooler.

According to another embodiment of the invention, the distribution layer 26 is closed to form a cylindrical tube around the stack 10, and the exhaust inlet 36 is placed on the outside surface of the distribution layer; then, the sheets 38, 40 are wrapped around the distribution layer 26 so a hump is formed during the rolling of the sheets around exhaust inlet 36.

Figure 10:
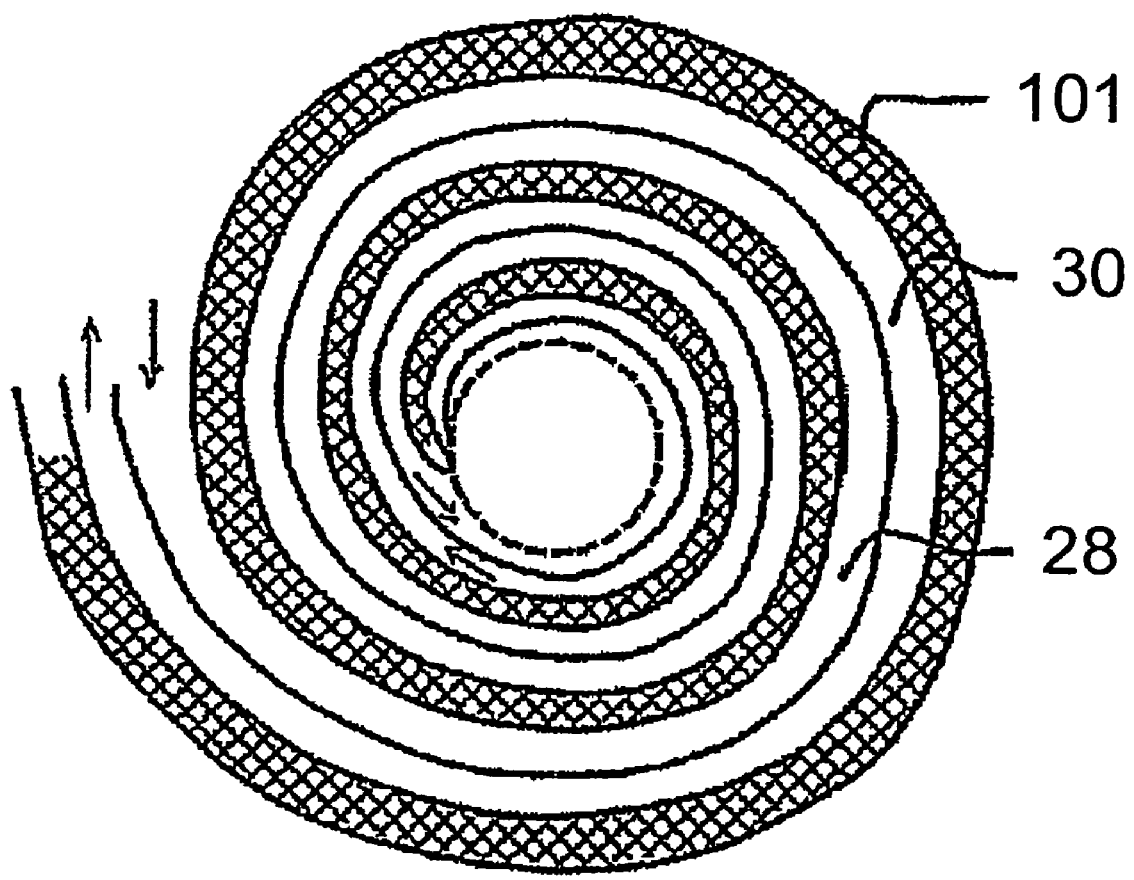
FIG. 10 is a schematic perspective view of another embodiment of an oxidant flow heat exchanger having an outer insulating layer wrapped around the fuel cell stack.

According to another embodiment of the invention and referring to FIG. 10, three sheets can be used instead of two sheets to form two oxidant flow channels, and an insulating layer 101. The insulating layer can be a ceramic thermal insulating blanket, an aerogel blanket, an aerogel filled layer, or a sealed vacuum channel.

Alternatively, the number of sheets can be increased to increase the number of channels. Or, the distribution layer 26 diameter can be increased to increase the length of the gas path. Or, the gas path can be increased by increasing the length of the sheets 38, 40, thereby increasing the number of turns of the sheets 38, 40 around the stack 10.

While the present invention has been described herein by the preferred embodiments, it will be understood to those skilled in the art that various changes may be made and added to the invention. The changes and alternatives are considered within the spirit and scope of the present invention. For example, the heat exchanger can be used with fuel cells other than SOFC; any fuel cell stack that must operate at elevated temperatures above 150° C. can be usefully combined with the heat exchanger.

What is claimed is:

1. A fuel cell system comprising
   a) a fuel cell stack comprising at least one solid oxide fuel cell; and
   b) a heat exchanger wrapped around the fuel cell stack, comprising a flexible thermally conductive first layer, a flexible thermally conductive second layer, and a distribution layer, the second layer overlapping the first layer such that when the layers are wrapped around the stack, annular reactant supply and exhaust channels are defined with heat from exhaust reactant flowing through the exhaust channel and heat radiating from the stack heating supply reactant flowing through the supply channel, the distribution layer comprising a perforated or porous metal foil surrounding the stack and located inside of the first and second layers, the distribution layer being in fluid communication with an outlet of the supply channel such that supply reactant discharged from the supply channel is radially distributed by the distribution layer to the stack.

2. A fuel cell system of claim 1 wherein the reactant supply channel includes one or both of an oxidant supply channel for flowing air therethrough and a fuel supply channel for flowing fuel therethrough, and the reactant exhaust channel includes one or both of an oxidant exhaust channel for flowing unreacted air therethrough, and a fuel exhaust channel for flowing unreacted fuel therethrough.

3. A fuel cell system of claim 1 wherein the exhaust channel is configured to flow a mixture of unreacted oxidant and fuel therethrough.

4. A fuel cell system of claim 2 wherein the heat exchanger is a cross-flow type heat exchanger with the supply and exhaust channels respectively having an inlet and an outlet at the outer periphery of the heat exchanger, and respectively having an outlet and an inlet at the interface between the heat exchanger and the stack.

5. A fuel cell system of claim 1 wherein the heat exchanger further comprises elongated flexible spacers mounted to a surface of each layer, the spacers cooperating with the layers to define the supply and exhaust channels when the layers are wrapped around the stack.

6. A fuel cell system of claim 1 wherein the metal foil is coated with one or more coatings selected from the group consisting of: thermal barrier ceramic coating, an oxidation barrier coating, heat reflective coating.

7. A fuel cell system of claim 1 wherein the stack comprises a plurality of tubular solid oxide fuel cells embedded in spaced side-by-side arrangement within a solid phase porous foam matrix.

8. A fuel cell system of claim 7 wherein the reactant flowing through the supply and exhaust channels is air and the stack further comprises an exhaust oxidant collector and the fuel cells surround the collector, the collector being fluidly coupled to an inlet of the reactant exhaust channel such that exhaust oxidant collected by the collector is transmitted to the exhaust channel.

9. A fuel cell system of claim 1 wherein the heat exchanger winds around the stack enough times to substantially absorb all of the heat radiated by the stack.

10. A fuel cell system of claim 1 wherein the heat exchanger layers are formed from a single folded metal foil sheet.

11. A fuel cell system of claim 1 wherein the two layers are of unequal transverse length, such that one of the layers can wrap at least one additional winding around the stack more than the other layer.

12. A fuel cell system of claim 1 wherein the heat exchanger further comprises a flexible thermally conductive third layer overlapping and spaced from the second layer, such that when wrapped around the stack with the first and second layers, a third reactant channel is formed.

13. A fuel cell system of claim 1 wherein the heat exchanger further comprises a flexible thermally insulating third layer overlapping the second layer, such that when wrapped around the stack with the first and second layers, the insulating layer contributes to retaining heat within the stack.

14. A fuel cell system of claim 13 wherein the insulating layer is selected from the group consisting of a ceramic thermal insulating blanket, an aerogel blanket, a sealed vacuum channel.

15. A fuel cell system of claim 1 wherein the heat exchanger comprises a fuel supply channel, an oxidant supply channel, and an mixed exhaust channel that discharges a mixture of unreacted air and fuel.

16. A fuel cell system of claim 1 wherein the heat exchanger comprises a fuel supply channel containing a reforming catalyst material that reforms hydrocarbon fuel flowing therethrough.

17. A fuel cell system of claim 1 wherein the first and second layers have a longitudinal length sufficiently exceeding the length of the fuel cells that one or both of the transverse edges of the layers can be brought together and partially or fully sealed closed.

18. A fuel cell system of claim 1 wherein the fuel cell is a tubular solid oxide fuel cell comprising a pair of concentrically arranged electrode layers sandwiching a concentrically arranged electrolyte layer.

* * * * *